United States Patent
Yamamoto et al.

(10) Patent No.: US 12,434,702 B2
(45) Date of Patent: Oct. 7, 2025

(54) TOWING VEHICLE CONTROL DEVICE, TOWING VEHICLE CONTROL METHOD, AND NON-TRANSITORY COMPUTER-READABLE MEDIUM

(71) Applicant: TOYOTA JIDOSHA KABUSHIKI KAISHA, Toyota (JP)

(72) Inventors: Naoki Yamamoto, Okazaki (JP); Shirou Monzaki, Mishima (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 276 days.

(21) Appl. No.: 18/196,797

(22) Filed: May 12, 2023

(65) Prior Publication Data

US 2023/0406308 A1 Dec. 21, 2023

(30) Foreign Application Priority Data

Jun. 21, 2022 (JP) .................... 2022-099861

(51) Int. Cl.
*B60W 30/18* (2012.01)

(52) U.S. Cl.
CPC . *B60W 30/18009* (2013.01); *B60W 2420/403* (2013.01); *B60W 2520/06* (2013.01);
(Continued)

(58) Field of Classification Search
CPC ..... B60W 30/18009; B60W 2420/403; B60W 2520/06; B60W 2520/10; B60W 2520/22;
(Continued)

(56) References Cited

U.S. PATENT DOCUMENTS 12,304,447 B2 * 5/2025 Laine .................. B60T 8/1708
2015/0210254 A1 * 7/2015 Pieronek ............... B60T 8/248
                                                           701/70
(Continued)

FOREIGN PATENT DOCUMENTS

DE  102018130426 A1 * 6/2020 ...... B60W 30/18036
DE  102020200022 A1 * 7/2021
(Continued)

OTHER PUBLICATIONS

English translation of DE-102018130426-A1 (Year: 2020).*
English translation of DE-102020200022-A1 (Year: 2021).*

*Primary Examiner* — Ramya P Burgess
*Assistant Examiner* — Preston Jay Miller
(74) *Attorney, Agent, or Firm* — Sughrue Mion, PLLC

(57) ABSTRACT

A towing vehicle control device includes: a computation device that computes a target vehicle body speed and a target curvature of a towing vehicle from a target vehicle body speed and a target curvature of a towed vehicle configured to travel together with the towing vehicle provided with motive power, and that generates a control signal for the motive power based on the target vehicle body speed of the towing vehicle, the target curvature of the towing vehicle, and a target articulation angle, which is a target value of an articulation angle that is an angle formed between a travel direction of the towing vehicle and a travel direction of the towed vehicle and is computed based on the target curvature of the towed vehicle; and a drive control section that controls the motive power of the towing vehicle in accordance with the control signal.

9 Claims, 10 Drawing Sheets

(52) U.S. Cl.
CPC ..... *B60W 2520/10* (2013.01); *B60W 2520/22* (2013.01); *B60W 2520/28* (2013.01); *B60W 2520/30* (2013.01)

(58) Field of Classification Search
CPC ......... B60W 2520/28; B60W 2520/30; B60W 10/04; B60W 2300/14; B60W 2720/28; B60W 2720/30; B60W 30/18; B60W 40/10
USPC .......................................................... 701/70
See application file for complete search history.

(56) References Cited

U.S. PATENT DOCUMENTS

| | | | | |
|---|---|---|---|---|
| 2015/0251541 | A1* | 9/2015 | Drako | B60L 3/106 |
| | | | | 701/22 |
| 2021/0107565 | A1* | 4/2021 | Biro | B62D 13/04 |
| 2021/0380109 | A1* | 12/2021 | Pourrezaei Khaligh | |
| | | | | B62D 15/0285 |
| 2022/0072999 | A1* | 3/2022 | Saylor | B60D 1/36 |
| 2023/0047444 | A1* | 2/2023 | Henderson | B60W 30/18172 |

FOREIGN PATENT DOCUMENTS

| | | | | |
|---|---|---|---|---|
| EP | 4011656 A1 * | 6/2022 | ............. | B60D 1/245 |
| EP | 4012330 A1 * | 6/2022 | ............. | B60R 11/04 |
| JP | 2019-156066 A | 9/2019 | | |

* cited by examiner

TOWING VEHICLE CONTROL DEVICE, TOWING VEHICLE CONTROL METHOD, AND NON-TRANSITORY COMPUTER-READABLE MEDIUM

CROSS-REFERENCE TO RELATED APPLICATION

This application claims priority under 35 USC 119 from Japanese Patent Application No. 2022-099861, filed on Jun. 21, 2022, the disclosure of which is incorporated by reference herein.

BACKGROUND

Technical Field

The present disclosure relates to a towing vehicle control device, a towing vehicle control method, and a non-transitory computer-readable medium storing a towing vehicle control program, which control a towing vehicle that tows a towed vehicle.

Related Art

When a towed vehicle travels to follow a towing vehicle in a state in which the towed vehicle is connected to a rear portion of the towing vehicle, rocking vibration and the like tend to occur in the towed vehicle.

Japanese Patent Application Laid-open (JP-A) No. 2019-156066, discloses a technology of a travel control device for a vehicle that reduces rocking vibration occurring in a towed vehicle, and stabilizes the behavior of the towed vehicle.

However, although the technology described in JP-A No. 2019-156066, corrects the steering of a towing vehicle based on the rocking of the towed vehicle during towing, since this correction does not consider the travel path of the towed vehicle, it has been difficult to cause the towed vehicle to travel along an appropriate path.

SUMMARY

The present disclosure provides a towing vehicle control device, a towing vehicle control method, and a non-transitory computer-readable medium storing a towing vehicle control program, which may cause a towed vehicle to travel along an appropriate trajectory.

A first aspect of the present disclosure is a towing vehicle control device that includes: a computation section that computes a target vehicle body speed and a target curvature of a towing vehicle from a target vehicle body speed and a target curvature of a towed vehicle, the towed vehicle configured to travel together with the towing vehicle in a state in which the towed vehicle is coupled to the towing vehicle, which is provided with motive power, via a connection part comprising a universal coupling, computes a target articulation angle, which is a target value of an articulation angle, the articulation angle being an angle formed between a travel direction of the towing vehicle and a travel direction of the towed vehicle, based on the target curvature of the towed vehicle, and generates a control signal for the motive power of the towing vehicle based on the target vehicle body speed of the towing vehicle, the target curvature of the towing vehicle, and the target articulation angle; and a drive control section that controls the motive power of the towing vehicle in accordance with the control signal.

According to the towing vehicle control device of the first aspect, by computing the control conditions for the towing vehicle in a case in which the towed vehicle is turned at a target curvature, the towed vehicle may be made to travel with an appropriate trajectory.

Depending on the target curvature, there may be cases in which, for example, the towing vehicle and the towed vehicle interfere with each other. However, the towing vehicle control device of the first aspect may cause the towed vehicle to travel according to the target curvature by controlling the towing vehicle in a state in which a positional relationship between the towing vehicle and the towed vehicle is restricted by a target articulation angle.

In a second aspect of the present disclosure, in the first aspect, may further include a wheel speed detection section configured to detect a wheel speed of each wheel of the towing vehicle, and an articulation angle detection section configured to detect the articulation angle, wherein the computation section may generate the control signal, which includes information regarding a required speed of each wheel of the towing vehicle, and information regarding a required torque of each wheel of the towing vehicle, computed based on respective results that are a result of feedback control to eliminate deviation between a target wheel speed of the towing vehicle computed from the target vehicle body speed of the towing vehicle and the target curvature of the towing vehicle, and the wheel speed detected by the wheel speed detection section, and a result of feedback control to eliminate deviation between the target articulation angle and the articulation angle detected by the articulation angle detection section.

According to the towing vehicle control device of the second aspect, by feedback control that eliminates deviations between observed values that are actually detected and target values, a control signal that includes information regarding a required speed for each wheel of the towing vehicle and information regarding a required torque for each wheel of the towing vehicle, may be generated.

In a third aspect of the present disclosure, in the second aspect, the articulation angle detection section may compute the articulation angle from an azimuth angle of the towing vehicle detected by an inertial measurement section installed at the towing vehicle and an azimuth angle of the towed vehicle detected by an inertial measurement section installed at the towed vehicle.

According to the towing vehicle control device of the third aspect, an inertial measurement device that is installed in many vehicles may be used to detect an observed value of the articulation angle between the towing vehicle and the towed vehicle.

In a fourth aspect of the present disclosure, in the second aspect, the articulation angle detection section may compute the articulation angle based on either a position of the towed vehicle in image information acquired by an image capture device installed at the towing vehicle or a position of the towing vehicle in image information acquired by an image capture device installed at the towed vehicle.

According to the towing vehicle control device of the fourth aspect, an image capture device that is installed in many vehicles may be used to detect an observed value of the articulation angle between the towing vehicle and the towed vehicle.

In a fifth aspect of the present disclosure, in any one of the first to the fourth aspects, the computation section may compute the target articulation angle when traveling in a state in which the towing vehicle is towing the towed vehicle.

According to the towing vehicle control device of the fifth aspect, when the towing vehicle tows the towed vehicle and travels forward, or when the towing vehicle tows the towed vehicle and travels rearward, the towed vehicle may be made to travel according to the target curvature by controlling the towing vehicle in a state in which the positional relationship between the towing vehicle and the towed vehicle is restricted by the target articulation angle.

A sixth aspect of the present disclosure is a method of controlling a towing vehicle, the method including: compute a target vehicle body speed and a target curvature of a towing vehicle from a target vehicle body speed and a target curvature of a towed vehicle, the towed vehicle configured to travel together with the towing vehicle in a state in which the towed vehicle is coupled to the towing vehicle, which is provided with motive power, via a connection part comprising a universal coupling, compute a target articulation angle, which is a target value of an articulation angle, the articulation angle being an angle formed between a travel direction of the towing vehicle and a travel direction of the towed vehicle, based on the target curvature of the towed vehicle, generate a control signal for the motive power of the towing vehicle based on the target vehicle body speed of the towing vehicle, the target curvature of the towing vehicle, and the target articulation angle, and control the motive power of the towing vehicle in accordance with the control signal.

According to the towing vehicle control method of the sixth aspect, by computing the control conditions for a towing vehicle in a case in which the towing vehicle is turned at a target curvature, the towed vehicle may be made to travel with an appropriate trajectory.

Depending on the target curvature, there may be cases in which, for example, the towing vehicle and the towed vehicle interfere with each other. However, the sixth aspect may enable the towed vehicle to be made to travel according to a target curvature by controlling the towing vehicle in a state in which a positional relationship between the towing vehicle and the towed vehicle is restricted by a target articulation angle.

A seventh aspect of the present disclosure is a non-transitory computer-readable medium storing a towing vehicle control program executable by a computer to function as: a computation section that, computes a target vehicle body speed and a target curvature of a towing vehicle from a target vehicle body speed and a target curvature of a towed vehicle, the towed vehicle configured to travel together with the towing vehicle in a state in which the towed vehicle is coupled to the towing vehicle, which is provided with motive power, via a connection part comprising a universal coupling, computes a target articulation angle, which is a target value of an articulation angle, the articulation angle being an angle formed between a travel direction of the towing vehicle and a travel direction of the towed vehicle, based on the target curvature of the towed vehicle, and generates a control signal for the motive power of the towing vehicle based on the target vehicle body speed of the towing vehicle, the target curvature of the towing vehicle, and the target articulation angle; and a drive control section that controls the motive power of the towing vehicle in accordance with the control signal.

According to the seventh aspect, by computing the control conditions for a towing vehicle in a case in which the towing vehicle is turned at a target curvature, the towed vehicle can be made to travel with an appropriate trajectory.

Depending on the target curvature, there may be cases in which, for example, the towing vehicle and the towed vehicle interfere with each other. However, the seventh aspect may enable the towed vehicle to travel according to a target curvature by controlling the towing vehicle in a state in which a positional relationship between the towing vehicle and the towed vehicle is restricted by a target articulation angle.

According to the foregoing aspects, the towing vehicle control device, the towing vehicle control method, and the non-transitory computer-readable medium storing a towing vehicle control program of the present disclosure may cause the towed vehicle to travel along an appropriate trajectory.

BRIEF DESCRIPTION OF THE DRAWINGS

Exemplary embodiments will be described in detail based on the following figures, wherein.

DETAILED DESCRIPTION

First Exemplary Embodiment

Figure 1:
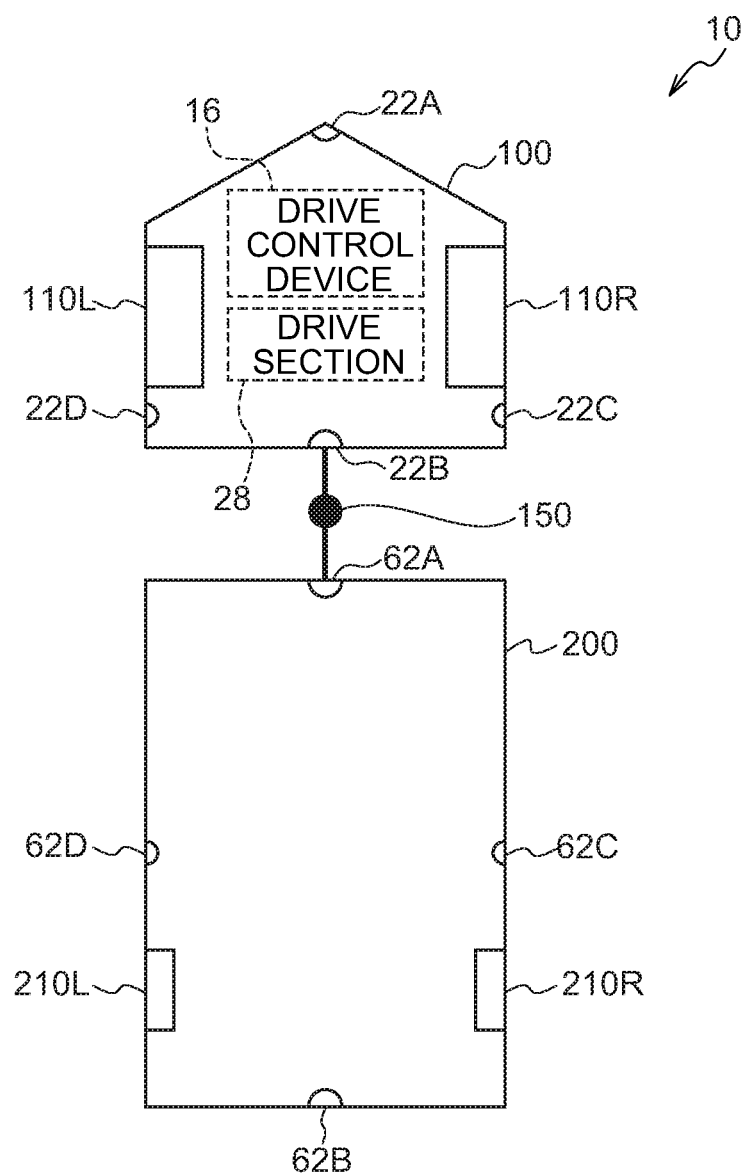
FIG. 1 is a schematic diagram of a towing vehicle installed with a towing vehicle control device, and of a towed vehicle, according to a first exemplary embodiment of the present disclosure.

In the following, the present exemplary embodiment is explained in detail with reference to the drawings. As illustrated in FIG. 1, a towing vehicle control device 10 according to the present exemplary embodiment includes a drive control device 16 that controls a drive section 28 of a towing vehicle 100 in consideration of the travel path of a towed vehicle 200 towed by the towing vehicle 100 in a state in which the towed vehicle 200 is coupled to the towing vehicle 100 by a connection section 150.

The towing vehicle 100 travels by rotating a right wheel 110R and a left wheel 110L by means of the drive section 28, which is a power source. The towed vehicle 200 includes a right wheel 210R and a left wheel 210L, and does not have a power source, but travels in accordance with towing by the towing vehicle 100 via the connection section 150. The drive section 28 that is the power source for the towing vehicle 100 may be an internal combustion engine, or may be an in-wheel motor provided at each wheel so as to enable the driving force distribution to be freely changed by individually controlling the respective wheels.

The towing vehicle 100 may be a manned vehicle driven by a driver, or may be an autonomous driving vehicle that autonomously travels based on information regarding the surroundings of the towing vehicle 100 acquired by an image capture device 22 (22A, 22B, 22C, 22D) or the like configured by an onboard camera or the like. An image capture device 62 (62A, 62B, 62C, 62D) is also provided at the towed vehicle 200 that is towed by the towing vehicle 100, and a wide range of image information facilitating autonomous driving of the towing vehicle 100 is obtained.

Moreover, the towing vehicle 100 is configured to turn in accordance with a difference in rotational speed between the left and right wheels. For example, if the rotation speed of the right wheel 110R is made larger than the rotation speed of the left wheel 110L, the towing vehicle 100 performs a left turn. Moreover, if the rotation speed of the left wheel 110L is made larger than the rotation speed of the right wheel 110R, the towing vehicle 100 turns to the right.

The connection section 150 is configured as a universal joint that changes freely in angle (articulation angle) in accordance with the travel of the towing vehicle 100 and the towed vehicle 200.

Figure 2:
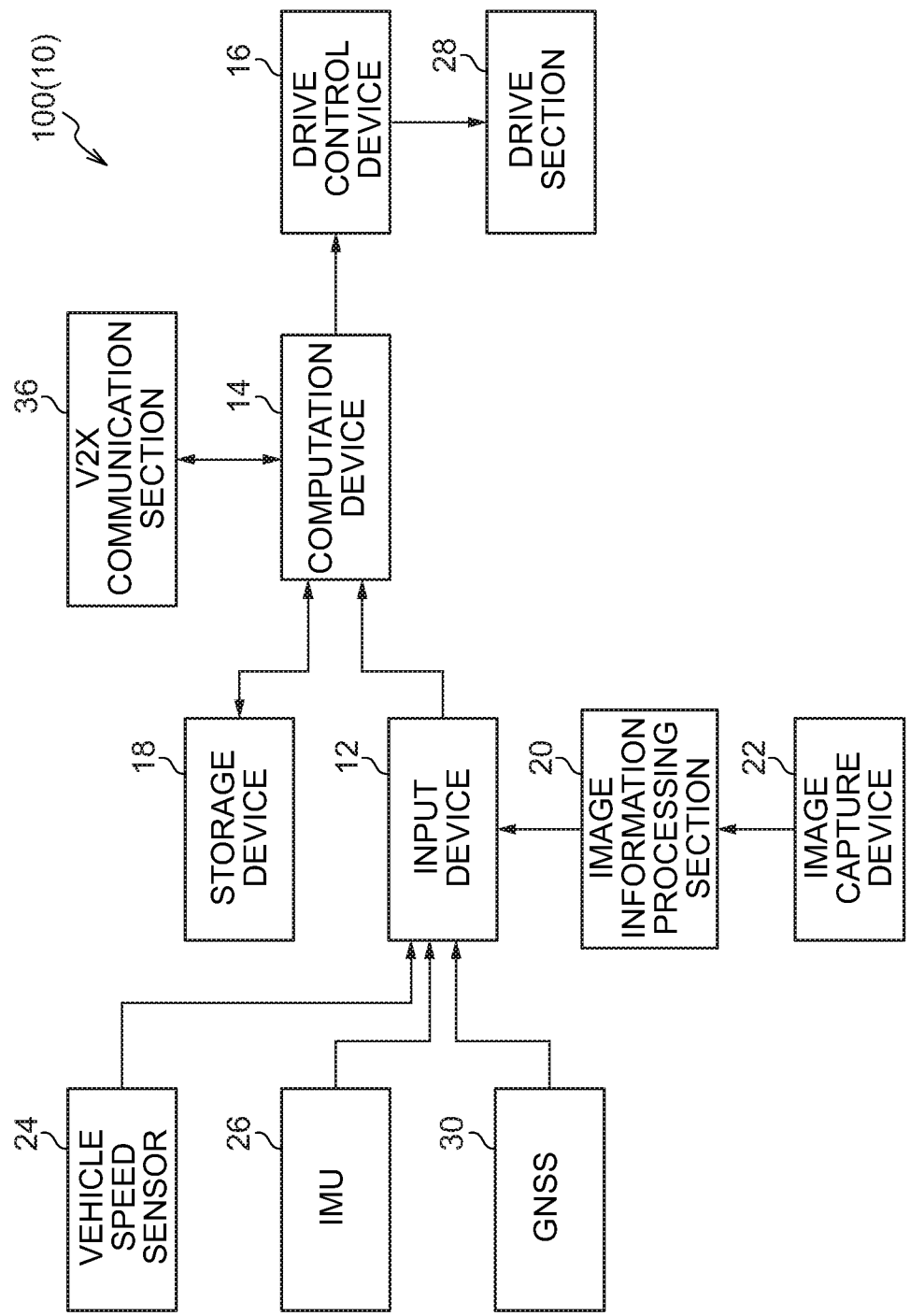
FIG. 2 is a block diagram illustrating a configuration included in the towing vehicle of the towing vehicle control device according to the first exemplary embodiment of the present disclosure.

FIG. 2 is a block diagram illustrating an example of a configuration included in the towing vehicle 100 of the towing vehicle control device 10 according to the present exemplary embodiment. As illustrated in FIG. 2, the towing vehicle control device 10 included in the towing vehicle 100 is configured by including: a storage device 18, an image information processing section 20, an input device 12, the computation device 14, a V2X communication section 36, and a drive control device 16. The storage device 18 stores data required for computation by a computation device 14 and computation results produced by the computation device 14. The image information processing section 20 converts image information acquired by the image capture device 22 into a format that enables image analysis by the computation device 14. The input device 12 is input by each of image information output by the image information processing section 20, the speed of each wheel of the towing vehicle 100 detected by a vehicle speed sensor 24, the angular velocity and acceleration of the azimuth angle of the towing vehicle 100 detected by an inertial measurement section (IMU) 26, and a current position of the towing vehicle 100 detected by a global navigation satellite system (GNSS) device 30, which is a satellite positioning system that detects the position of the towing vehicle 100 based on information received from a satellite. The computation device 14, generates a control signal for controlling the drive section 28 that is a power source of the towing vehicle 100 based on input data input from the input device 12 and data stored in the storage device 18. The V2X communication section 36 is able to communicate with the towed vehicle 200 and the like. The drive control device 16 controls the drive section 28 that is a power source of the towing vehicle 100 in accordance with a control signal generated by computation performed by the computation device 14. Although the V2X communication section 36 is for performing wireless communication, in a case in which the communication partner is limited to the towed vehicle 200, wired communication may be employed via the connection section 150.

The IMU 26 is an inertial measurement device that detects tri-axial angular velocities (pitch rate, roll rate, yaw rate) and tri-axial acceleration (longitudinal acceleration, lateral acceleration, vertical acceleration) that indicate vehicle behavior during travel.

Figure 3:
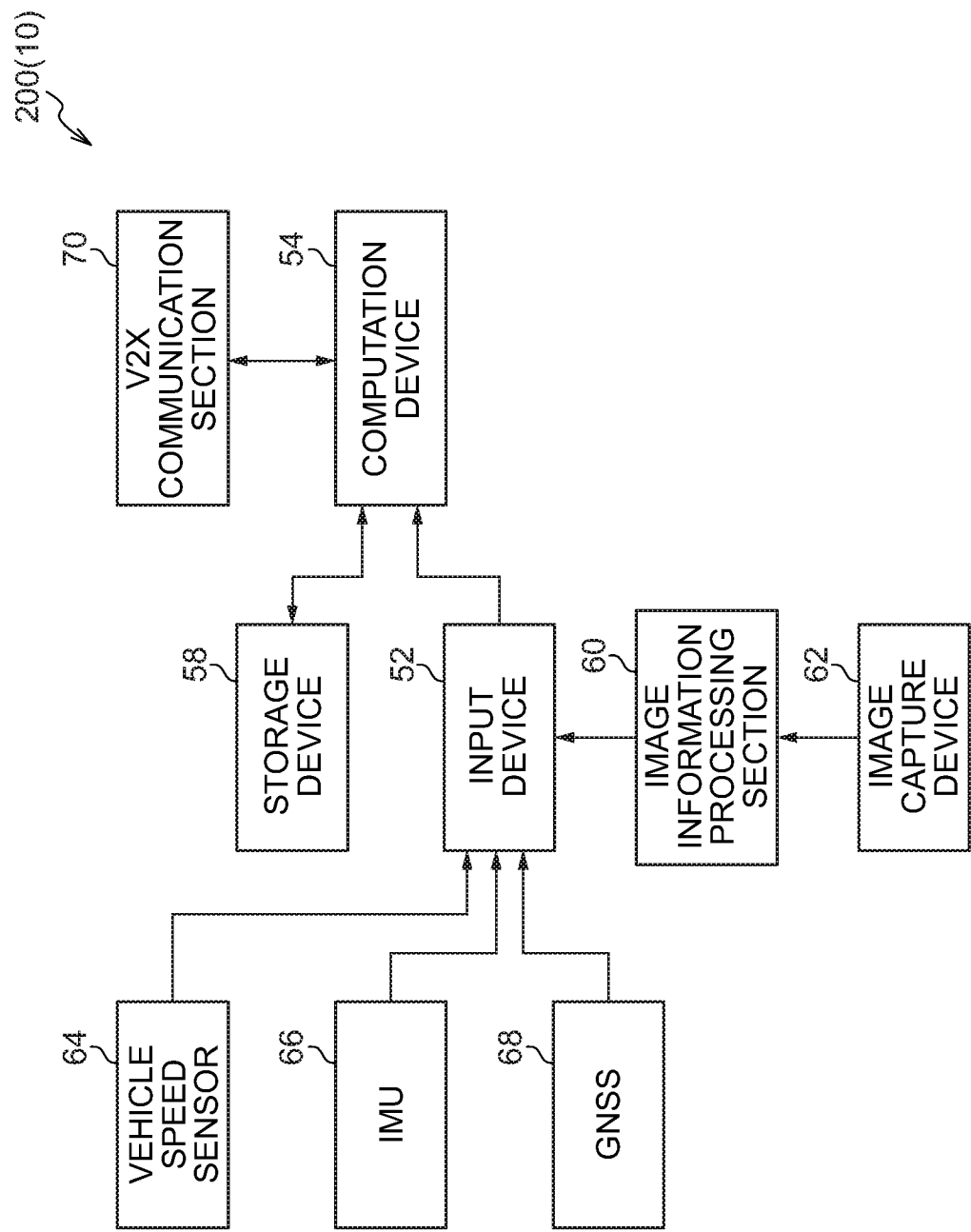
FIG. 3 is a block diagram illustrating a configuration included in the towed vehicle of the towing vehicle control device according to the first exemplary embodiment of the present disclosure.

FIG. 3 is a block diagram illustrating an example of a configuration included in the towed vehicle 200 of the towing vehicle control device 10 according to the present exemplary embodiment. As illustrated in FIG. 3, the towing vehicle control device 10 included in the towed vehicle 200, similarly to the configuration included in the towing vehicle 100, is configured by including: an input device 52, a computation device 54, a storage device 58, an image capture device 62, an image processing section 60, a vehicle speed sensor 64, an IMU 66, a GNSS device 68, and a V2X communication section 70. However, since the towed vehicle 200 does not have a power source, it is not provided with the drive control device 16 or the drive section 28 configuring the power source that are included in the towing vehicle. Although the V2X communication section 70 is for performing wireless communication, similarly to the V2X communication section 36 of the towing vehicle 100, in a case in which the communication partner is limited to the towing vehicle 100, wired communication may be employed via the connection section 150.

Similarly to the IMU 26 of the towing vehicle 100, the IMU 66 is an inertial measurement device that detects tri-axial angular velocities and tri-axial acceleration indicative of vehicle behavior during travel.

The computation device 54 performs computation and the like of the articulation angle, which is an angle formed by a travel direction of the towing vehicle 100 and a travel direction of the towed vehicle 200, and is the angle at which the connection section 150 bends in accordance with the travel of the towing vehicle 100 and the towed vehicle 200 as discussed above. For example, the articulation angle may be computed from image information acquired by the image capture device 62, or may be computed based on the information acquired by each of the IMU 66 and the GNSS device 68. The articulation angle computed by the computation device 54 is output to the computation device 14 of the towing vehicle 100 via the V2X communication section 70 and the V2X communication section 36 of the towing vehicle 100.

Figure 4:
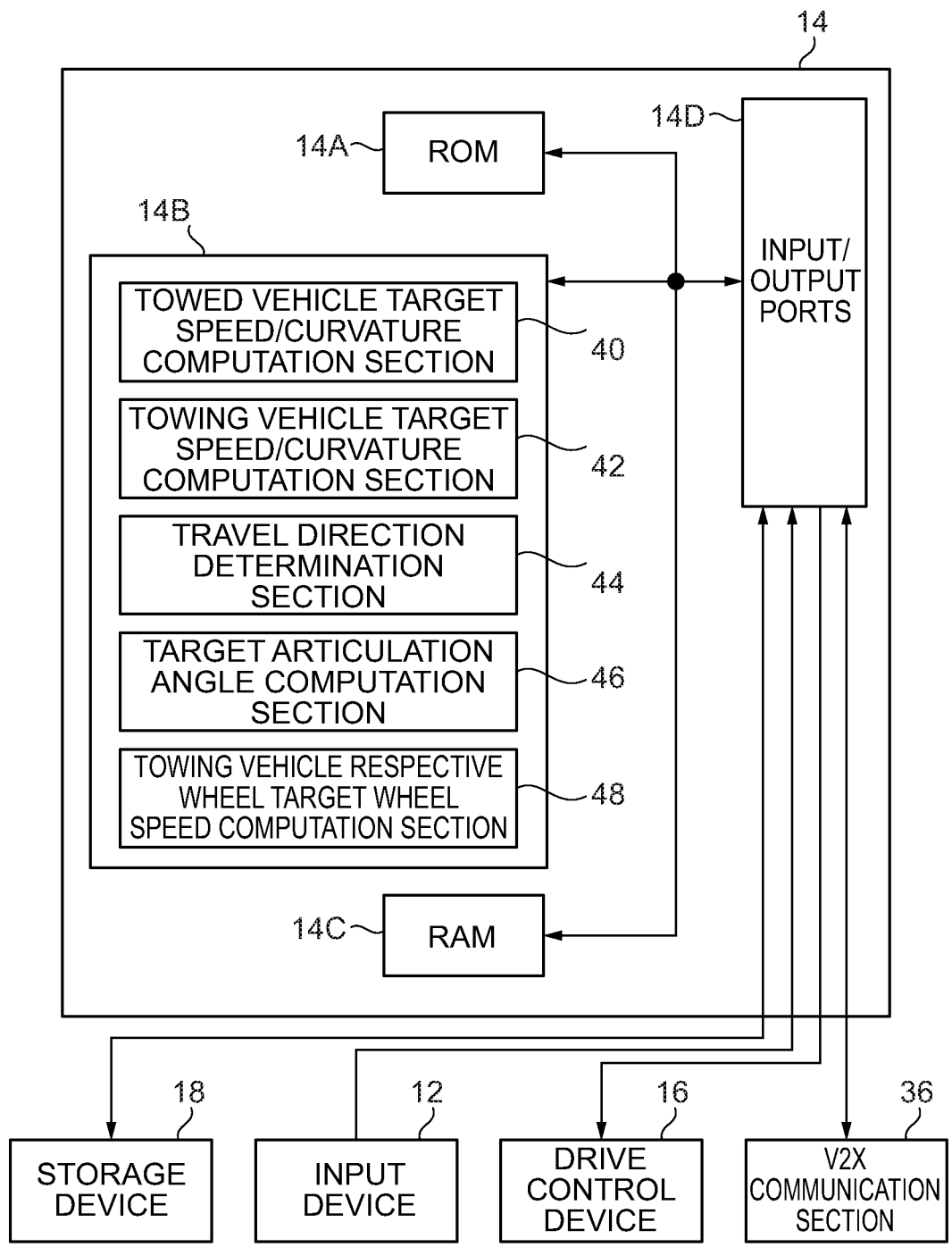
FIG. 4 is a block diagram illustrating of a configuration of a computation device.

FIG. 4 is a block diagram illustrating an example of a specific configuration of the computation device 14. The computation device 14 is a type of computer, and includes a central processing section (CPU) 14B, read only memory (ROM) 14A, random access memory (RAM) 14C, and an input/output port 14D.

In the computation device 14, the CPU 14B, the ROM 14A, the RAM 14C, and the input/output port 14D are connected together via various buses such as an address bus, a data bus, and a control bus. The input/output port 14D is connected to various input/output devices such as the input device 12, the storage device 18, which is configured by a hard disk (HDD) or the like, the drive control device 16, and the V2X communication section 36.

A towing vehicle control program that generates a control signal to control the drive section 28 is installed at the storage device 18. In the present exemplary embodiment, the CPU 14B executes the towing vehicle control program and thereby generates a control signal for controlling the drive section 28. Moreover, the CPU 14B outputs a control signal generated by the towing vehicle control program to the drive control device 16. Although there are several ways to install the towing vehicle control program of the present exemplary embodiment into the computation device 14, the towing vehicle control program is stored, for example, together with a setup program in a CD-ROM, DVD, or the like, the disk is loaded into a disk drive or the like, which is an input/output device, and the towing vehicle control program is installed at the storage device 18 by executing the setup program on the CPU 14B. Alternatively, the towing vehicle control program may be installed in the storage device 18 by communication with another information processing device connected to the computation device 14 via a public telephone line or a network.

Next, explanation is provided regarding various functions implemented by execution of the towing vehicle control program by the CPU 14B of the computation device 14. The towing vehicle control program causes the vehicle control program to function as: a towed vehicle target speed and curvature computation functionality that computes the target speed and target curvature of the towed vehicle 200; a towing vehicle target speed and curvature computation functionality that computes the target speed and curvature of the towing vehicle 100; a travel direction determination functionality that determines a travel direction of the towing vehicle 100; a target articulation angle functionality that computes a target articulation angle; and a towing vehicle respective wheel target wheel speed computation functionality that computes a target wheel speed for each wheel of the towing vehicle 100. By executing the towing vehicle control program, the CPU 14B functions as a towed vehicle target speed/curvature computation section 40, a towing vehicle target speed/curvature computation section 42, a travel direction determination section 44, a target articulation angle computation section 46, and a towing vehicle respective wheel target wheel speed computation section 48.

Figure 5:
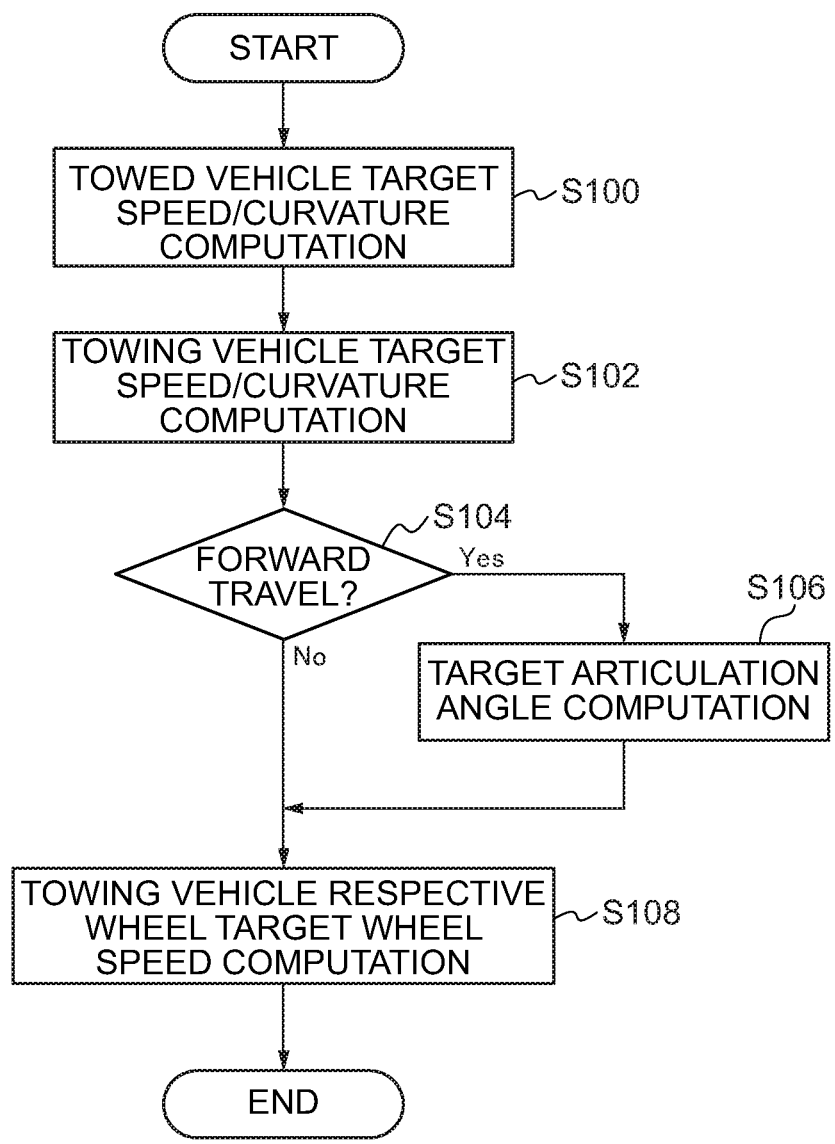
FIG. 5 is a flow chart illustrating processing performed by the computation device of the towing vehicle of the towing vehicle control device according to the first exemplary embodiment of the present disclosure.

FIG. 5 is a flowchart illustrating an example of processing performed by the computation device 14 of the towing vehicle 100 of the towing vehicle control device 10 according to the present exemplary embodiment.

At step S100, the target speed and target curvature of the towed vehicle 200 are computed. Regarding the target speed and target curvature of the towed vehicle 200, in a case in which the towing vehicle 100 is a manned vehicle, as an example, the speed of the towing vehicle 100 is set as the target speed of the towed vehicle 200, and the target curvature is computed based on the amount of operation by the driver of the towing vehicle 100. For example, as expressed by the formula below, a quotient obtained by dividing a yaw rate Y detected by the IMU 26 of the towing vehicle 100 by a velocity $V_T$ of the towing vehicle 100 is denoted as the target curvature $\kappa_t$ of the towed vehicle 200.

$$\kappa_t = Y/V_T$$

Regarding the yaw rate of the towing vehicle 100, since this is also a quotient obtained by dividing the difference between the wheel speed $V_{Tr}$ of the right wheel 110R and the wheel speed $V_{Tl}$ of the left wheel 110L of the towing vehicle 100 by the distance T (tread) between the right wheel 110R and the left wheel 110L, as expressed by the formula below, the target curvature $\kappa_t$ of the towed vehicle 200 may be a quotient obtained by dividing the difference between the wheel speed $V_{Tr}$ of the right wheel 110R of the towing vehicle 100 and the wheel speed $V_{Tl}$ of the left wheel 110L by the product of the tread T and the speed $V_T$ of the towing vehicle 100.

$$\kappa_t = (V_{Tr} - V_{Tl})/T \cdot V_T$$

Alternatively, the target speed and the target curvature $\kappa_t$ of the towed vehicle 200 may be set arbitrarily.

At step S102, the target speed and target curvature of the towing vehicle 100 are computed from the target speed and target curvature of the towed vehicle 200.

Figure 6:
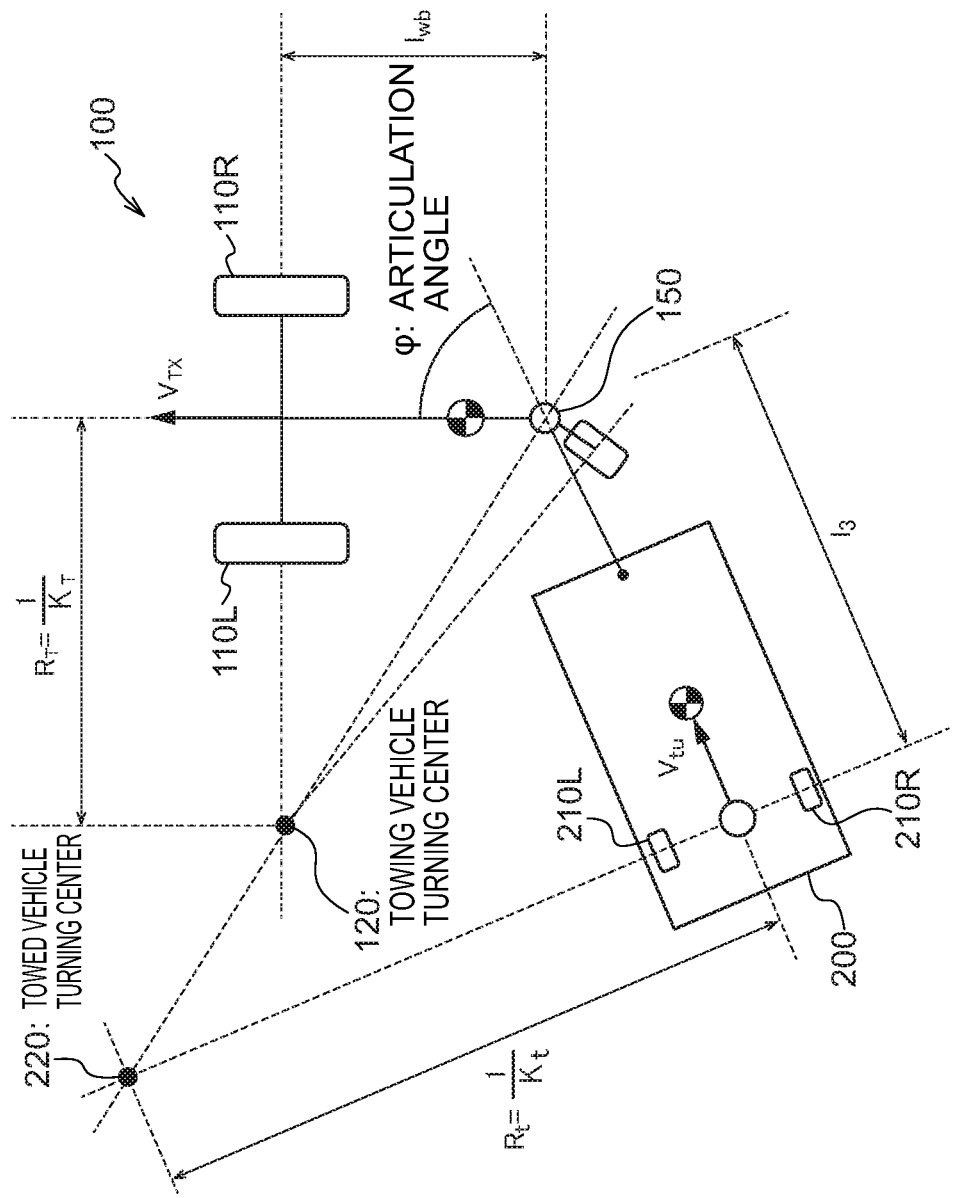
FIG. 6 is an explanatory diagram illustrating the behavior of the towing vehicle and the towed vehicle during a turn.

FIG. 6 is an explanatory diagram illustrating an example of behavior of the towing vehicle 100 and the pulled vehicle 200 during turning. In FIG. 6, the target velocity $V_{tu}$ of the towed vehicle 200, the target curvature $\kappa_t$ of the towed vehicle 200, the target velocity $V_T$ of the towing vehicle 100, the target curvature $\kappa_T$ of the towing vehicle 100, the articulation angle φ, the distance $l_{wb}$ from the axle position of the towing vehicle 100 to the connection section 150, the distance $l_3$ from the connection section 150 to the axle position of the towed vehicle 200, the turning radius $R_T$, which is the distance from a towing vehicle turning center 120 to a midpoint between the right wheel 110R and the left wheel 110L of the towing vehicle 100, and a turning radius $R_t$, which is the distance from a towed vehicle turning center 220 to a midpoint between the right wheel 210R and the left wheel 210L of the towed vehicle 200, are each defined.

Based on the state illustrated in FIG. 6, the following Formulae (1) and (2) are defined.

$$V_{tu} = V_{Tx} \cos \varphi + l_{wb} V_{Tx} \kappa_T \sin \varphi \tag{1}$$

$$l_3 \kappa_t V_{tu} = V_{Tx} \sin \varphi - l_{wb} V_{Tx} \kappa_T \cos \varphi \tag{2}$$

From Formulae (1) and (2) above, Formula (3) for computing the target velocity $V_{Tx}$ of the towing vehicle 100, and Formula (4) for computing the target curvature $\kappa_T$ of the towing vehicle 100 are derived. At step S102, using the following Formulae (3) and (4), the target speed $V_{Tx}$ and the target curvature $\kappa_T$ of the towing vehicle 100 are computed from the target speed $V_{tu}$ and the target curvature $\kappa_t$ of the towed vehicle 200.

$$V_{Tx} = V_{tu} \cos \varphi + l_3 \kappa_t V_{tu} \sin \varphi \tag{3}$$

$$\kappa_T = \frac{\tan \varphi - l_3 \kappa_t}{l_{wb}(1 + l_3 \kappa_t \tan \varphi)} \tag{4}$$

At step S104, it is determined whether or not the towing vehicle 100 is moving forward. As an example, the determination as to whether or not there is forward movement is performed based on the direction of acceleration detected by the IMU 26 included in the towing vehicle 100. This is because in a case in which the towing vehicle 100 tows the towed vehicle 200, the articulation angle φ becomes an issue only during forward movement.

In a case in which it is determined at step S104 that the towing vehicle 100 is moving forward, the process proceeds to step S106, and in a case in which it is determined that the towing vehicle 100 is not moving forward, the process proceeds to step S108.

Figure 7:
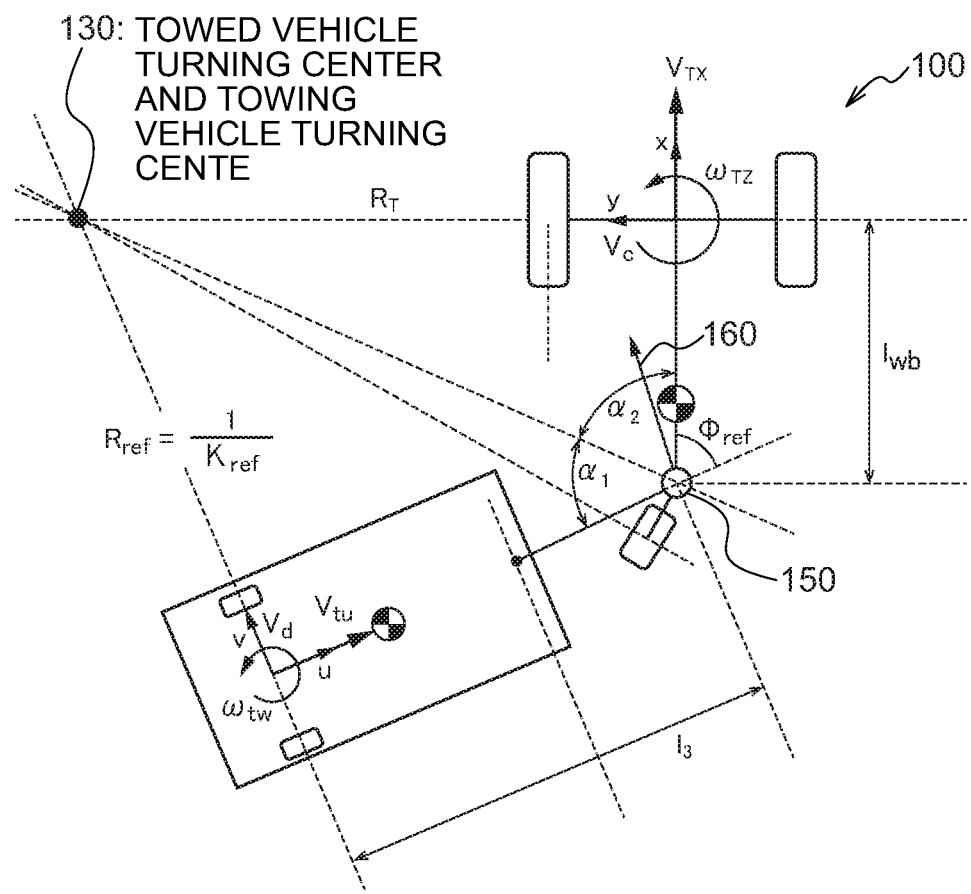
FIG. 7 is an explanatory diagram illustrating the behavior of the towing vehicle and the towed vehicle during a turn in a computation of a target articulation angle.

At step S106, the target articulation angle $\varphi_{ref}$ is computed. FIG. 7 is an explanatory diagram illustrating the behavior of the towing vehicle 100 and the towed vehicle 200 during a turn in a computation of the target articulation angle (ref. In FIG. 7, the turning center of the towing vehicle 100 and the turning center of the towed vehicle 200 are coincident with each other as a towed vehicle turning center and a towed vehicle turning center (hereafter "turning center") 130.

As illustrated in FIG. 7, in the towing vehicle 100 in a turning state, the midpoint between the right wheel 110R and the left wheel 110L moves at the target speed $V_{Tx}$ in the x-axis direction and at the lateral speed $V_c$ in the y-axis direction, and a yaw rate $\omega_{Tz}$ is generated at a midpoint between the right wheel 110R and the left wheel 110L.

Moreover, the midpoint between the right wheel 210R and the left wheel 210L of the towed vehicle 200 in a turning state moves at the target speed $V_{tx}$ in the u-axis direction and at the lateral speed $V_d$ in the v-axis direction, and a yaw rate $\omega_{tz}$ is generated at a midpoint between the right wheel 210R and the left wheel 210L. Further, the connection section 150 moves in the direction of the velocity vector 160.

In such cases, the target articulation angle $\varphi_{ref}$ can be expressed by Formula (5) below.

$$\varphi_{ref} = \pi - \alpha_1 - \alpha_2 \quad (5)$$

As illustrated in FIG. 7, since the tangent to $\alpha_1$ is $R_{ref}/l_3$ ($R_{ref} = 1/\kappa_{ref}$), $\alpha_1$ can be expressed by Formula (6) below.

$$\alpha_1 = \tan^{-1}\left(\frac{1}{l_3 \kappa_{ref}}\right) \quad (6)$$

Further, as illustrated in FIG. 7, since the tangent to $\alpha_2$ is $R_T/l_{wb}$, $\alpha_2$ can be expressed by Formula (7) below.

$$\alpha_2 = \tan^{-1}\left(\frac{R_T}{l_{wb}}\right) \quad (7)$$

$L^2$, which is the square of the distance between the connection section 150 and the turning center 130, can be expressed as follows.

$$L_2 = l_3^2 + (1/\kappa_{ref})^2$$

As a result, $R_T$ in the foregoing Formula (7) can be expressed by the following Formula (8). As illustrated in FIG. 6, $R_T$ may be computed as an inverse of the target curvature $\kappa_T$ of the towing vehicle 100.

$$R_T = \sqrt{l_3^2 + \left(\frac{1}{\kappa_{ref}}\right)^2 - l_{wb}^2} \quad (8)$$

At step S106, the target articulation angle $\varphi_{ref}$ is computed using the foregoing Formulae (5) to (8).

At step S108, the target wheel speeds of the respective wheels of the towing vehicle 100 are computed. Hereinafter, as an example, the target wheel speed of the right wheel 110R is computed, but the target wheel speed of the left wheel 110L can be computed using a similar process.

Figure 8:
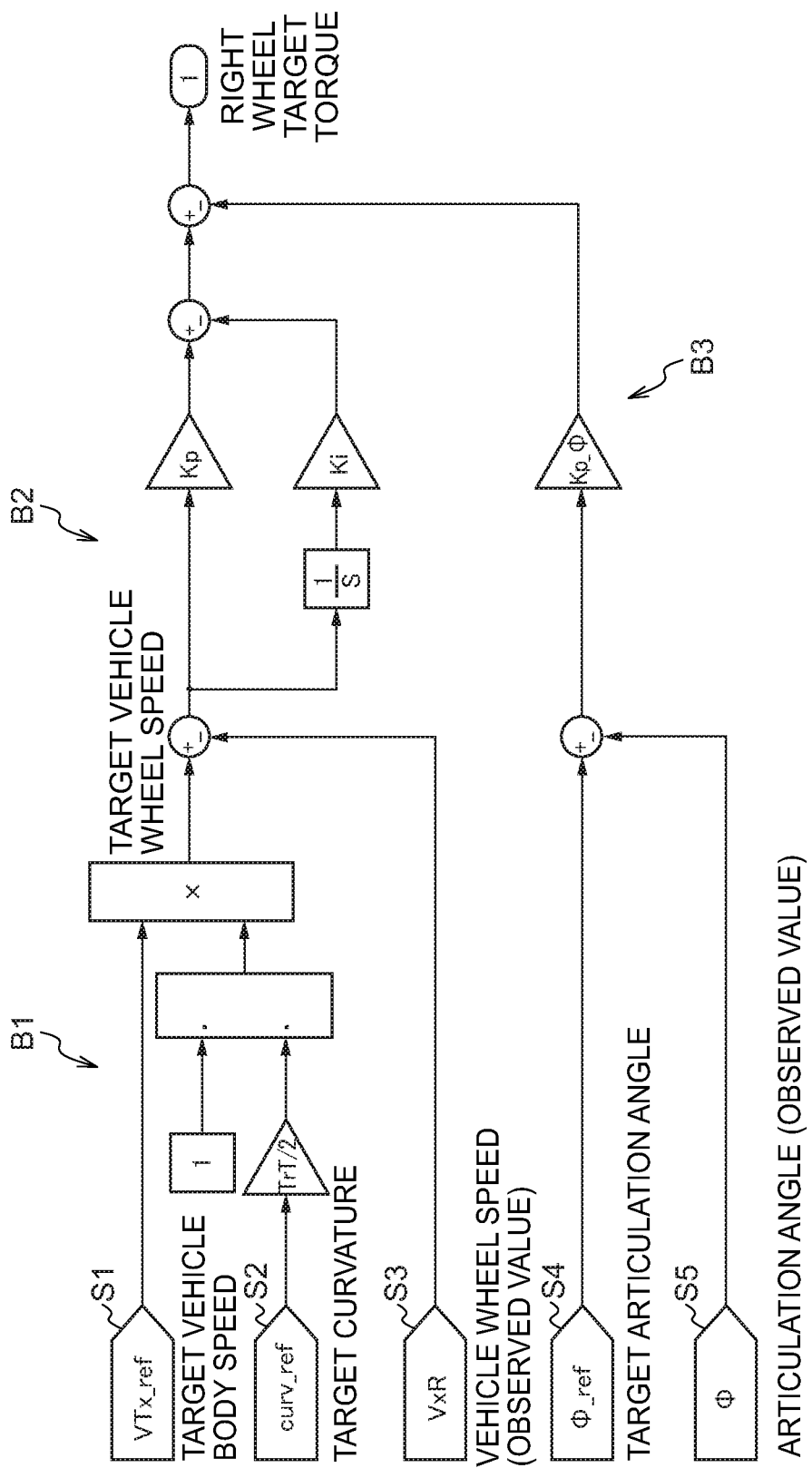
FIG. 8 is an activity diagram when computing a right wheel target wheel speed and a right wheel target torque of the towing vehicle.

FIG. 8 is an example of an activity diagram when computing a right wheel target wheel speed and a right wheel target torque of the towing vehicle 100. At step S1, the target vehicle body speed VTx_ref (=$V_{Tx}$) of the towing vehicle 100 is input. At step S2, the target curvature curv_ref (=$\kappa_T$) of the towing vehicle 100 is input. At step S3, the wheel speed of the right wheel 110R of the towing vehicle 100, which is the observed value detected by the vehicle speed sensor 24, is input. At step S4, the target articulation angle $\varphi_{ref}$, is input. At step S5, the articulation angle $\varphi$, which is an observed value, is input. As an example, the articulation angle $\varphi$ that is an observed value is computed by comparing the azimuth angle of the towing vehicle 100 with the azimuth angle of the towed vehicle 200. The azimuth angle of the towing vehicle 100 is obtained by time integration of the yaw rate detected by the IMU 26 with reference to the position of the towing vehicle 100 at the global coordinates detected by the GNSS device 30 of the towing vehicle 100. The azimuth angle of the towed vehicle 200 is obtained by time integration of the yaw rate detected by the IMU 66 with reference to the position of the towed vehicle 200 at the global coordinates detected by the GNSS device 68 of the towed vehicle 200.

The articulation angle $\varphi$, which is an observed value, may be computed from image information acquired by the image capture device 22 of the towing vehicle 100 or the image capture device 62 of the towed vehicle 200. More specifically, the articulation angle $\varphi$, which is an observed value, is computed based on the position of the towed vehicle 200 in the image information acquired by the image capture device 22B of the towing vehicle 100. Alternatively, the articulation angle $\varphi$, which is an observed value, may be computed based on the position of the towing vehicle 100 in the image information acquired by the image capture device 62A of the towed vehicle 200.

At block B1, the target wheel speed of the towing vehicle 100 is computed from the target vehicle body speed VTx_ref and the target curvature curv_ref. As described above, the yaw rate of the towing vehicle 100 is a quotient, obtained by dividing the difference between the wheel speed $V_{Tr}$ of the right wheel 110R and the wheel speed $V_{Tl}$ of the left wheel 110L of the towing vehicle 100 by the tread T. Here, the tread T is the distance between the right wheel 110R and the left wheel 110L. Since the target curvature curv_ref is a quotient, obtained by dividing the yaw rate of the towing vehicle 100 by the target vehicle body speed VTx_ref of the towing vehicle 100, a relationship according to the following Formula is observed:

$$\text{curv\_ref} = (V_{Tr} - V_{Tl})/T \cdot \text{VTx\_ref}$$

As an example, in block B1, in a case in which the towing vehicle 100 turns left, for example, presuming that the foregoing Formula is satisfied by $V_{Tr}$>VTx_ref>$V_{Tl}$, the target wheel speeds of the right wheel 110R and the left wheel 110L are computed.

In block B2, deviation of the target wheel speed computed in block B1 from the wheel speed of the right wheel 110R of the towing vehicle 100, which is the observed value detected by the vehicle speed sensor 24, is eliminated using a proportional-integral controller (PI), which is feedback control. In block B1, proportional control (P control), which eliminates deviations linearly, and integration control (I control), which eliminates the deviation in proportion to the time integration of the deviation, are performed.

At block B3, deviation of the target articulation angle $\varphi_{ref}$ input at step S4 from the articulation angle $\varphi$, which is the observed value input at step S5, is eliminated using I control, which is feedback control.

The right wheel target torque is computed from the output result of block B2 and the output result of block B3. An algorithm that computes the right wheel target torque from the value of the right wheel speed, which is the output result of block B2, and the value of the articulation angle $\varphi$, which is the output result of block B3, is, as an example, constructed through machine learning and the like.

After computing the respective wheel target wheel speeds (and the target torque) of the towing vehicle 100 at step S108, the processing is ended.

The computation device 14 outputs a control signal including the computed target wheel speeds (and target torque) of the respective wheels of the towing vehicle 100 to the drive control device 16, and the drive control device 16 controls the drive section 28 in accordance with the input control signal.

As explained above, according to the present exemplary embodiment, by computing the control conditions for the towing vehicle 100 in a case in which the towed vehicle 200 is turned at a given curvature, the towed vehicle may be made to travel with an appropriate trajectory.

In the present exemplary embodiment, the value of the target curvature $\kappa_T$ of the towing vehicle 100 is required when computing the target wheel speed of each wheel, which is a control condition for the towing vehicle 100. However, as illustrated in FIG. 6, the target curvature $\kappa_T$ of the towing vehicle 100 can be geometrically computed.

However, depending on the travel conditions, there may be cases in which it becomes difficult for the towing vehicle 100 to travel with the geometrically computed target curvature $\kappa_T$. For example, in a case in which the towing vehicle 100 travels at a target curvature $\kappa_T$, and in a case in which the towed vehicle 100 and the towed vehicle 200 interfere with each other, a positional relationship between the towing vehicle 100 and the towed vehicle 200 cannot be established, and thus, the towing vehicle 100 may not travel with the computed target curvature $\kappa_T$.

In the present exemplary embodiment, by imposing restrictions on the positional relationship between the towing vehicle 100 and the towed vehicle 200, the target curvature $\kappa_t$ of the towed vehicle 200 can be set at a given value by simulation. The restriction on the positional relationship in the present exemplary embodiment is, more specifically, the articulation angle $\varphi$, which is an angle formed by the towing vehicle 100 and the towed vehicle 200. In the present exemplary embodiment, the target articulation angle (ref for realizing a certain target curvature is approximately computed, and is considered as a restriction on the positional relationship between the towing vehicle 100 and the towed vehicle 200.

Geometrically, the articulation angle $\varphi$ is not uniquely determined from a given target curvature $\kappa_t$ of the towed vehicle 200. However, in the present exemplary embodiment, the target articulation angle $\varphi_{ref}$ is approximately treated as the target value, and by reflecting this in the control of the towing vehicle 100, the target curvature $\kappa_t$ of the towed vehicle 200 can be set arbitrarily.

Generally, the towed vehicle 200 holds passengers or cargo, and is the priority entity when considering a travel path. Further, the towing vehicle 100 that tows the towed vehicle 200 is a subordinate entity to the towed vehicle 200. Moreover, in cases in which the towed vehicle 200 is very large, such as in the case of a trailer, control tailored to the size of the towed vehicle 200 is required. In the present exemplary embodiment, as described above, the target curvature $\kappa_t$ of the towed vehicle 200 can be set arbitrarily, and therefore, simply by first considering how to move the towed vehicle 200, it is possible to control the towing vehicle 100 in response to movement of the towed vehicle 200.

Second Exemplary Embodiment

Figure 9A:
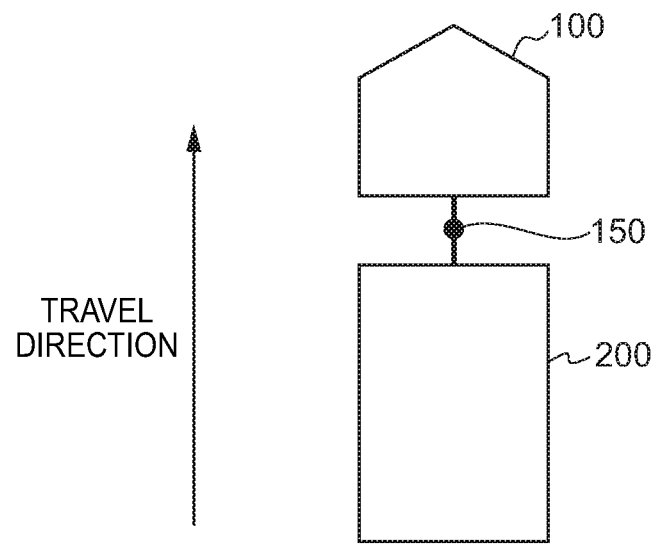
FIG. 9A is a schematic diagram illustrating a case in which the towing vehicle in the first exemplary embodiment tows the towed vehicle.
Figure 9B:
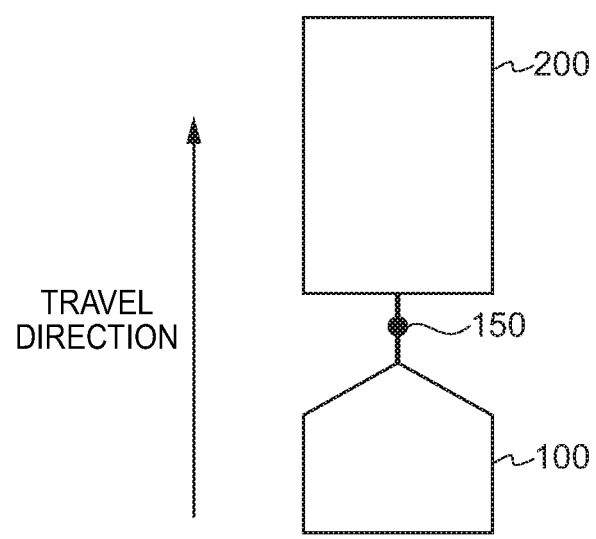
FIG. 9B is a schematic diagram illustrating a case in which the towing vehicle according to a second exemplary embodiment pushes the towed vehicle from behind.

Next, explanation is provided regarding a second exemplary embodiment of the present disclosure. FIG. 9A is a schematic diagram of a case in which the towing vehicle 100 according to the first exemplary embodiment tows the towed vehicle 200, and FIG. 9B is a schematic diagram of a case in which the towing vehicle 100 according to the present exemplary embodiment pushes the towed vehicle 200 from behind. The difference relative to the first exemplary embodiment of the present exemplary embodiment is found in whether the towing vehicle 100 pushes the towed vehicle 200 from behind or pulls the towed vehicle 200. Therefore, the respective configurations of the towing vehicle 100 and the towed vehicle 200 are the same as those of the first exemplary embodiment. Accordingly, configurations that are the same as those of the first exemplary embodiment are allocated the same reference numerals as those of the first exemplary embodiment, and detailed explanation thereof is omitted.

Figure 10:
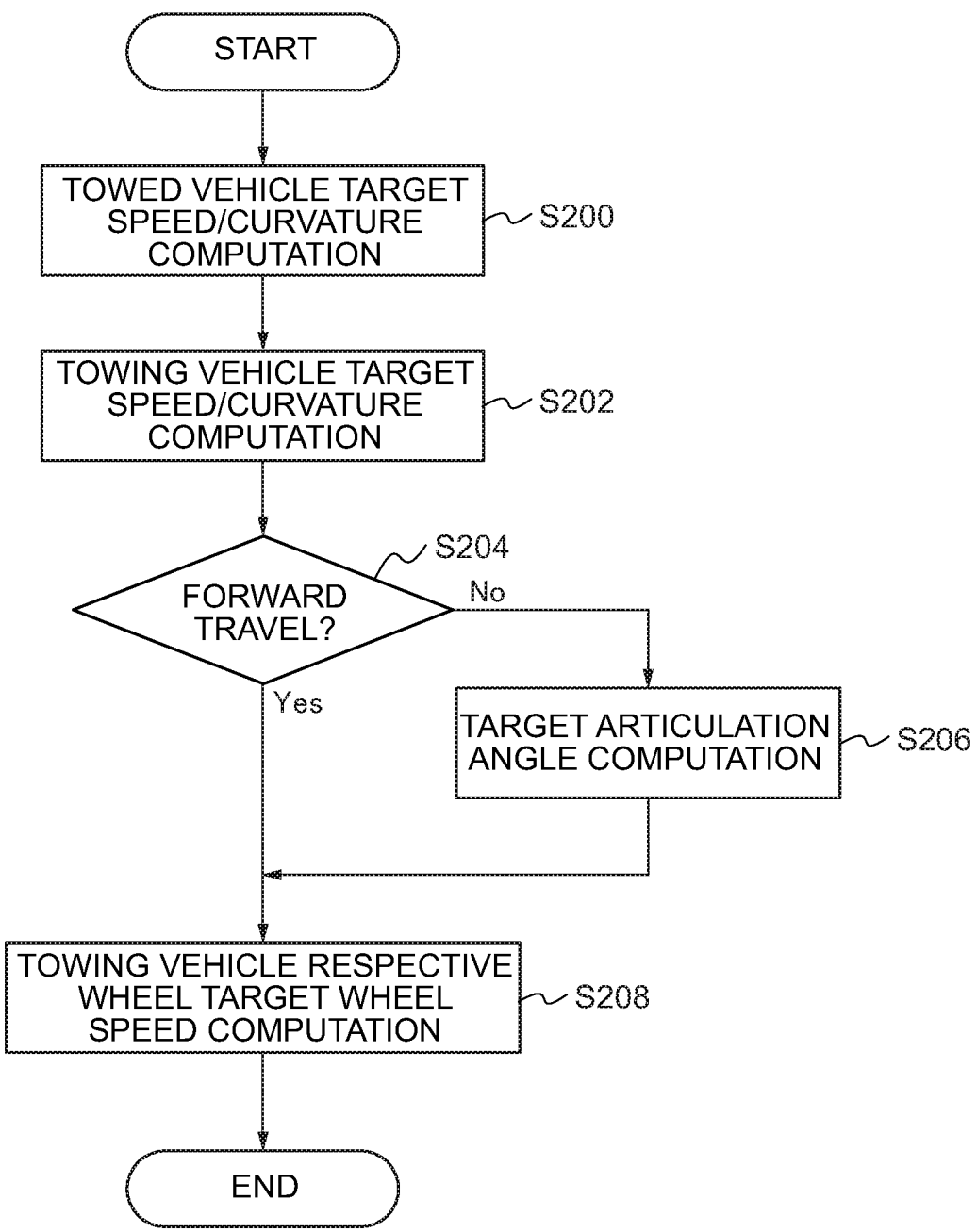
FIG. 10 is a flow chart illustrating processing performed by the computation device of the towing vehicle of the towing vehicle control device according to the second exemplary embodiment of the present disclosure.

FIG. 10 is a flowchart illustrating an example of processing performed by the computation device 14 of the towing vehicle 100 of the towing vehicle control device 10 according to the present exemplary embodiment.

At step S200, similarly to step S100 of FIG. 5 in the first exemplary embodiment, the target speed and target curvature of the towed vehicle 200 are computed. The target speed and the target curvature $\kappa_t$ of the towed vehicle 200 may be set arbitrarily.

At step S202, similarly to step S102 of FIG. 5 in the first exemplary embodiment, the target speed and target curvature of the towing vehicle 100 are computed from the target speed and target curvature of the towing vehicle 200.

At step S204, similarly to step S104 of FIG. 5 in the first exemplary embodiment, it is determined whether or not the towing vehicle 100 is moving forward. As an example, the determination as to whether or not there is forward movement is performed based on the direction of acceleration detected by the IMU 26 included in the towing vehicle 100. In a case in which the towing vehicle 100 pushes the towed vehicle 200 from behind, the articulation angle $\varphi$ becomes an issue only during rearward travel. This is because when traveling rearward in the present exemplary embodiment, the towing vehicle 100 is in a state of traveling while towing the towed vehicle 200, similarly to at the time of forward movement in the first exemplary embodiment.

In a case in which it is determined at step S204 that the towing vehicle 100 is moving forward, the process proceeds to step S208, and in a case in which it is determined that the towing vehicle 100 is not moving forward, the process proceeds to step S206.

At step S206, similarly to step S106 of FIG. 5 in the first exemplary embodiment, the target articulation angle $\varphi_{ref}$ is computed.

At step S208, similarly to step S108 of FIG. 5 in the first exemplary embodiment, the target wheel speeds of the respective wheels of the towing vehicle 100 are computed.

After computing the respective wheel target wheel speeds (and target torques) of the towing vehicle 100 at step S208, the processing is ended.

The computation device 14 outputs a control signal including the computed target wheel speeds (and target torque) of the respective wheels of the towing vehicle 100 to the drive control device 16, and the drive control device 16 controls the drive section 28 in accordance with the input control signal.

As explained above, according to the present exemplary embodiment, by reflecting the target articulation angle in the control of the towing vehicle 100 when the towing vehicle 100 and the towed vehicle 200 are moving rearward, the target curvature $\kappa_t$ of the towed vehicle 200 can be set arbitrarily. Moreover, by computing the control conditions of the towing vehicle 100 when the towed vehicle 200 is turned at a given target curvature $\kappa_t$, the towed vehicle may be made to travel with an appropriate trajectory.

The processing executed by the CPUs reading and executing software (a program) in the above-described exemplary embodiments may be executed by various types of processor other than a CPU. Such processors include programmable logic devices (PLD) that allow circuit configuration to be modified post-manufacture, such as a field-programmable gate array (FPGA), and dedicated electric circuits, these being processors including a circuit configuration custom-designed to execute specific processing, such as an application specific integrated circuit (ASIC). The processing may be executed by any one of these various types of processor, or by a combination of two or more of the same type or different types of processor (such as plural FPGAs, or a combination of a CPU and an FPGA). The hardware structure of these various types of processors is more specifically an electric circuit combining circuit elements such as semiconductor elements.

Although explanation has been given regarding an aspect in which a program is stored (installed) in advance in a disk drive or the like in the above-described exemplary embodiments, there is no limitation thereto. The programs may be provided in a format stored on a non-transitory storage medium such as compact disc read only memory (CD-ROM), digital versatile disc read only memory (DVD-ROM), or universal serial bus (USB) memory. Alternatively, the programs may be provided in a format downloadable from an external device over a network.

The "computation section" or "processor" corresponds to the "computation device 14" in the detailed description, the "drive control section" to the "drive control device 16", the "wheel speed detection section" to the "vehicle speed sensor 24", and the "articulation angle detection section" to the "IMU 26", "image capture device 22" and "computation device 14".

Appendix 1

A towing vehicle control device, comprising:
a memory; and
at least one processor coupled to the memory, the processor being configured to:
compute a target vehicle body speed and a target curvature of a towing vehicle from a target vehicle body speed and a target curvature of a towed vehicle, the towed vehicle configured to travel together with the towing vehicle in a state in which the towed vehicle is coupled to the towing vehicle, which is provided with motive power, via a connection part comprising a universal coupling,
compute a target articulation angle, which is a target value of an articulation angle, the articulation angle being an angle formed between a travel direction of the towing vehicle and a travel direction of the towed vehicle, based on the target curvature of the towed vehicle,
generate a control signal for the motive power of the towing vehicle based on the target vehicle body speed of the towing vehicle, the target curvature of the towing vehicle, and the target articulation angle, and
control the motive power of the towing vehicle in accordance with the control signal.

What is claimed is:

1. A towing vehicle control device, comprising:
a memory; and
at least one processor coupled to the memory, the processor being configured to:
compute a target vehicle body speed and a target curvature of a towing vehicle from a target vehicle body speed and a target curvature of a towed vehicle, the towed vehicle configured to travel together with the towing vehicle in a state in which the towed vehicle is coupled to the towing vehicle, which is provided with motive power, via a connection part comprising a universal coupling,
compute a target articulation angle, which is a target value of an articulation angle, the articulation angle being an angle formed between a travel direction of the towing vehicle and a travel direction of the towed vehicle, based on the target curvature of the towed vehicle,
detect a wheel speed of each wheel of the towing vehicle and detect the articulation angle,
generate a control signal for the motive power of the towing vehicle based on the target vehicle body speed of the towing vehicle, the target curvature of the towing vehicle, and the target articulation angle, the control signal including information regarding a required speed of each wheel of the towing vehicle and information regarding a required torque of each wheel of the towing vehicle, computed based on a result of feedback control to eliminate deviation between the detected wheel speed and a target wheel speed of the towing vehicle computed from the target vehicle body speed of the towing vehicle and the target curvature of the towing vehicle, and a result of feedback control to eliminate deviation between the detected articulation angle and the target articulation angle, and
control the motive power of the towing vehicle in accordance with the control signal.

2. The towing vehicle control device of claim 1, wherein the processor is configured to compute the articulation angle from an azimuth angle of the towing vehicle detected by an inertial measurement section installed at the towing vehicle, and from an azimuth angle of the towed vehicle detected by an inertial measurement section installed at the towed vehicle.

3. The towing vehicle control device of claim 1, wherein the processor is configured to compute the articulation angle based on either a position of the towed vehicle in image information acquired by an image capture device installed at the towing vehicle, or a position of the towing vehicle in image information acquired by an image capture device installed at the towed vehicle.

4. The towing vehicle control device of claim 1, wherein the processor is configured to compute the target articulation angle when traveling in a state in which the towing vehicle is towing the towed vehicle.

5. The towing vehicle control device of claim 1, wherein the towing vehicle is an autonomous driving vehicle that autonomously travels based on information regarding surroundings of the towing vehicle acquired by an image capture device.

6. The towing vehicle control device of claim 1, wherein the processor is configured to compute the target curvature of the towed vehicle according to $$K_t = \frac{V_{Tr} - V_{Tl}}{T * V_T},$$

wherein $K_t$ is the target curvature of the towed vehicle, $V_{Tr}$ is a detected wheel speed of a right wheel of the towing vehicle, $V_{Tl}$ is a detected wheel speed of a left wheel of a towing vehicle, $V_T$ is a velocity of the towing vehicle, and T is a distance between the left wheel and the right wheel of the towing vehicle.

7. The towing vehicle control device of claim 6, wherein the processor is configured to:
compute the target vehicle body speed of the towing vehicle according to $V_{Tx}=V_{tu} \cos \varphi + l_3 K_t \sin \varphi$, wherein $V_{Tx}$ is the target vehicle body speed of the towing vehicle, $\varphi$ is the detected articulation angle, $V_{tu}$ is the target velocity of the towed vehicle, and $l_3$ is a distance from the connection part to an axle of the towed vehicle, and
compute the target curvature of the towing vehicle according to $$K_T = \frac{\tan \varphi - l_3 K_t}{l_{wb}(1 + l_3 K_t \tan \varphi)},$$

wherein $K_T$ is the target curvature of the towing vehicle, and $l_{wb}$ is a distance from an axle of the towing vehicle to the connection part.

8. A method of controlling a towing vehicle, the method comprising:
compute a target vehicle body speed and a target curvature of a towing vehicle from a target vehicle body speed and a target curvature of a towed vehicle, the towed vehicle configured to travel together with the towing vehicle in a state in which the towed vehicle is coupled to the towing vehicle, which is provided with motive power, via a connection part comprising a universal coupling,
compute a target articulation angle, which is a target value of an articulation angle, the articulation angle being an angle formed between a travel direction of the towing vehicle and a travel direction of the towed vehicle, based on the target curvature of the towed vehicle,
detect a wheel speed of each wheel of the towing vehicle and detect the articulation angle,
generate a control signal for the motive power of the towing vehicle based on the target vehicle body speed of the towing vehicle, the target curvature of the towing vehicle, and the target articulation angle, the control signal including information regarding a required speed of each wheel of the towing vehicle and information regarding a required torque of each wheel of the towing vehicle, computed based on a result of feedback control to eliminate deviation between the detected wheel speed and a target wheel speed of the towing vehicle computed from the target vehicle body speed of the towing vehicle and the target curvature of the towing vehicle, and a result of feedback control to eliminate deviation between the detected articulation angle and the target articulation angle, and
control the motive power of the towing vehicle in accordance with the control signal.

9. A non-transitory computer-readable medium storing a towing vehicle control program executable by a computer to function as:
a wheel speed detection section that detects a wheel speed of each wheel of a towing vehicle;
an articulation angle detection section that detects an articulation angle, the articulation angle being an angle formed between a travel direction of the towing vehicle and a travel direction of a towed vehicle;
a computation section that:
computes a target vehicle body speed and a target curvature of the towing vehicle from a target vehicle body speed and a target curvature of the towed vehicle, the towed vehicle configured to travel together with the towing vehicle in a state in which the towed vehicle is coupled to the towing vehicle, which is provided with motive power, via a connection part comprising a universal coupling,
computes a target articulation angle, which is a target value of the articulation angle based on the target curvature of the towed vehicle, and
generates a control signal for the motive power of the towing vehicle based on the target vehicle body speed of the towing vehicle, the target curvature of the towing vehicle, and the target articulation angle, the control signal including information regarding a required speed of each wheel of the towing vehicle and information regarding a required torque of each wheel of the towing vehicle, computed based on a result of feedback control to eliminate deviation between the detected wheel speed and a target wheel speed of the towing vehicle computed from the target vehicle body speed of the towing vehicle and the target curvature of the towing vehicle, and a result of feedback control to eliminate deviation between the detected articulation angle and the target articulation angle; and
a drive control section that controls the motive power of the towing vehicle in accordance with the control signal.

* * * * *